(12) United States Patent
Davis

(10) Patent No.: US 9,921,802 B1
(45) Date of Patent: Mar. 20, 2018

(54) SYSTEM FOR PRESENTING MEDIA CONTENT

(71) Applicant: Kenneth Davis, Ruidoso, NM (US)

(72) Inventor: Kenneth Davis, Ruidoso, NM (US)

(*) Notice: Subject to any disclaimer, the term of this patent is extended or adjusted under 35 U.S.C. 154(b) by 0 days.

(21) Appl. No.: 15/257,902

(22) Filed: Sep. 6, 2016

Related U.S. Application Data

(63) Continuation of application No. 14/484,064, filed on Sep. 11, 2014, now Pat. No. 9,436,366.

(60) Provisional application No. 61/954,904, filed on Mar. 18, 2014.

(51) Int. Cl.
| | |
|---|---|
| *G06F 3/048* | (2013.01) |
| *G06F 3/16* | (2006.01) |
| *G06Q 30/06* | (2012.01) |
| *G06F 3/0485* | (2013.01) |
| *G06F 3/0482* | (2013.01) |
| *G06F 3/0481* | (2013.01) |

(52) U.S. Cl.
CPC ............ *G06F 3/165* (2013.01); *G06F 3/0482* (2013.01); *G06F 3/0485* (2013.01); *G06F 3/04817* (2013.01); *G06Q 30/0643* (2013.01); *G06F 2203/04802* (2013.01)

(58) Field of Classification Search
CPC ...... G06F 3/0481–3/04886; G06F 2203/04802
See application file for complete search history.

*Primary Examiner* — Claudia Dragoescu
(74) *Attorney, Agent, or Firm* — John G. Fischer, Esq.; Scheef & Stone, L.L.P.

(57) ABSTRACT

The present invention provides a system for presenting media content. A user device (such as a personal computer, tablet, or smart phone) receives media elements from a media repository. The media repository may be remote. The device displays references associated with the media elements in a display area. The device outputs media content (e.g., music or video) associated with each of the media elements for a limited duration (e.g., 30 seconds). While outputting, the references displayed in the display area are scrolled. The display area may be provided as a 3D drum.

23 Claims, 7 Drawing Sheets

SYSTEM FOR PRESENTING MEDIA CONTENT

CROSS-REFERENCE TO RELATED APPLICATIONS

This application is a continuation of U.S. application Ser. No. 14/484,064, now U.S. Pat. No. 9,436,366, issued Sep. 6, 2016, which claims the benefit of U.S. Provisional Application No. 61/954,904, filed Mar. 18, 2014, which is hereby incorporated by reference.

TECHNICAL FIELD

The present invention relates generally to systems for presenting media content, and more particularly providing a graphical user interface for displaying a playlist and previewing media content related to the playlist.

BACKGROUND

Media content (e.g., music and videos) today is delivered and sold primarily via digital channels. Record stores are of the past. Customers rarely go to a record store, flip through records in their favorite section, or listen to records before buying.

Today's digital market places have replaced the record store experience with long lists of categories, albums, artists, and songs. A disadvantage of these digital market places is that customers must read through long lists and click through numerous webpages to find what they are looking for. Another disadvantage is that it is inefficient for customers to sample the content before buying. Still yet another disadvantage is that the experience is not engaging for the customer.

As such, there is a need for a system for allowing users to more efficiently select and preview content. There is further a need for a system that provides a more immersive and engaging experience for a customer.

SUMMARY

The present invention provides a system for presenting media content. The system comprises a processor and a memory device operably coupled to the processor. The memory device is configured for storing program code, which when executed by the processor, causes the processor to perform the steps of: displaying one or more references in a playlist-display area, wherein the one or more references are associated with one or more media elements; outputting media content associated with a first media element of the one or more media elements; displaying a play-indicator for indicating the reference associated with the first media element; scrolling the references while audio is being output; and automatically outputting media content associated with a second media element of the one or more media elements after a play-duration.

In an alternate embodiment, the system further displays a preview-speed-control button or bar for controlling the play-duration of each media element.

In another embodiment, the playlist-display area comprises a graphical representation of a rotating 3D drum.

In still another embodiment, the system receives the media elements and content from a remote media repository.

In yet another embodiment, the output of the end portion of one media content is faded out and the output of the beginning portion of the next media content is faded in. In other embodiments, there may be a silence gap between outputs or no gap. Alternatively, the next media content may be faded in while the previous output is being faded out.

In another embodiment, a play-order control button is provided for reversing the order in which media elements are played.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. Additionally, as used herein, the term "substantially" is to be construed as a term of approximation.

It is noted that, unless indicated otherwise, all functions described herein may be performed by a processor such as a microprocessor, a controller, a microcontroller, an application-specific integrated circuit (ASIC), an electronic data processor, a computer, or the like, in accordance with code, such as program code, software, integrated circuits, and/or the like that are coded to perform such functions. Furthermore, it is considered that the design, development, and implementation details of all such code would be apparent to a person having ordinary skill in the art based upon a review of the present description of the invention.

Figure 1:
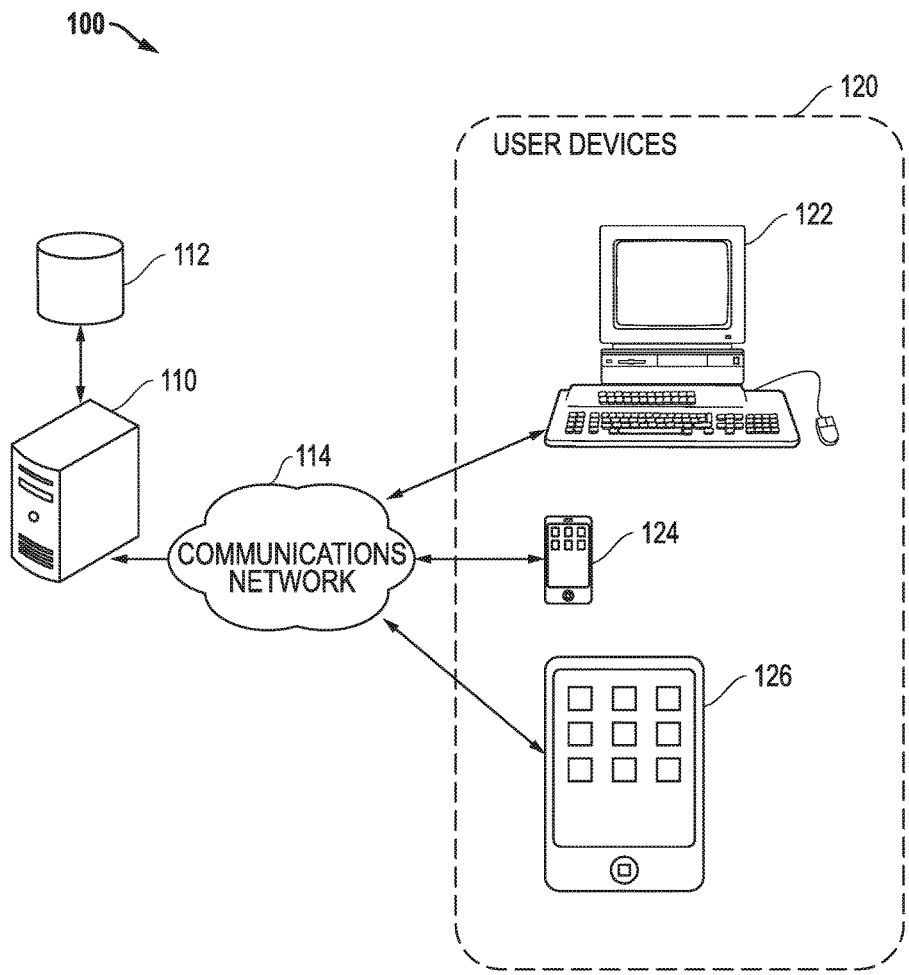
FIG. 1 is a block diagram depicting a system in accordance with the present invention.

Referring to FIG. 1, a block diagram of system 100 is provided. System 100 comprises server 110. Server 110 may be a single server or a plurality of servers. Servers 110 are communicatively coupled to one or more storage devices 112. Storage devices 112 store a plurality of media elements. Each media element is associated with media content, such as audio data (e.g., music), audio-visual data (e.g., movies), and the like. Each media element is also associated with metadata, such as alphanumeric information (e.g., artist, song title, album name, and purchase price) and visual information (e.g., cover art). Storage devices 112 may be comprised of one or more hard drives, databases, repositories, or other storage devices, or combinations thereof. Storage devices 112 may preferably be implemented using a cloud-based content distribution network (CDN). Servers 110 are also communicatively coupled to user devices 120 via a communications network 114, such as the Internet or other means.

User devices 120 preferably comprise personal computers (PCs) 122, smart phones 124, tablets 126, and similar devices (e.g., including smart TVs, video game consoles, and kiosks). Each user device 120 includes: a processor for running software and outputting media content; a communications interface (e.g., Wi-Fi, cellular, Ethernet, and Bluetooth) for communicating with server 110; a display for displaying a graphical user interface; operating system software (e.g., Android, Apple iOS, or Microsoft Windows) for running applications processing media content; an audio output interface (i.e., to a speaker); and a user input interface for obtaining user inputs (e.g., from a touchscreen, mouse, or keyboard). In other embodiments, a user device 120 may include a 3D gaming engine (e.g., blender™, available from www.blender.org, or three.js, available from www.threejs.org).

In accordance with principles of the present invention, user device 120 includes program code for providing a graphical user interface for presenting media content and related information. The program code may be in the form of an application, for example, a web browser application (e.g., HTML, Adobe Flash™, etc.), a standalone application, such as an Android® or Apple® application, or similar means. The program code may be stored at server 110 and transmitted to user device 120. The program code, running on user device 120, is configured to receive a selection of media elements or category of media elements and transmit the selection to server 110. Server 110 then retrieves the associated media elements from repository 112 and transmits the associated media elements to user device 120. Server 110 then transmits the media elements (collectively referred to as a playlist), which may be streamed or transmits the full content. User device 120 then displays information associated with the media elements and plays the media content as explained in more detail below.

Figure 2:
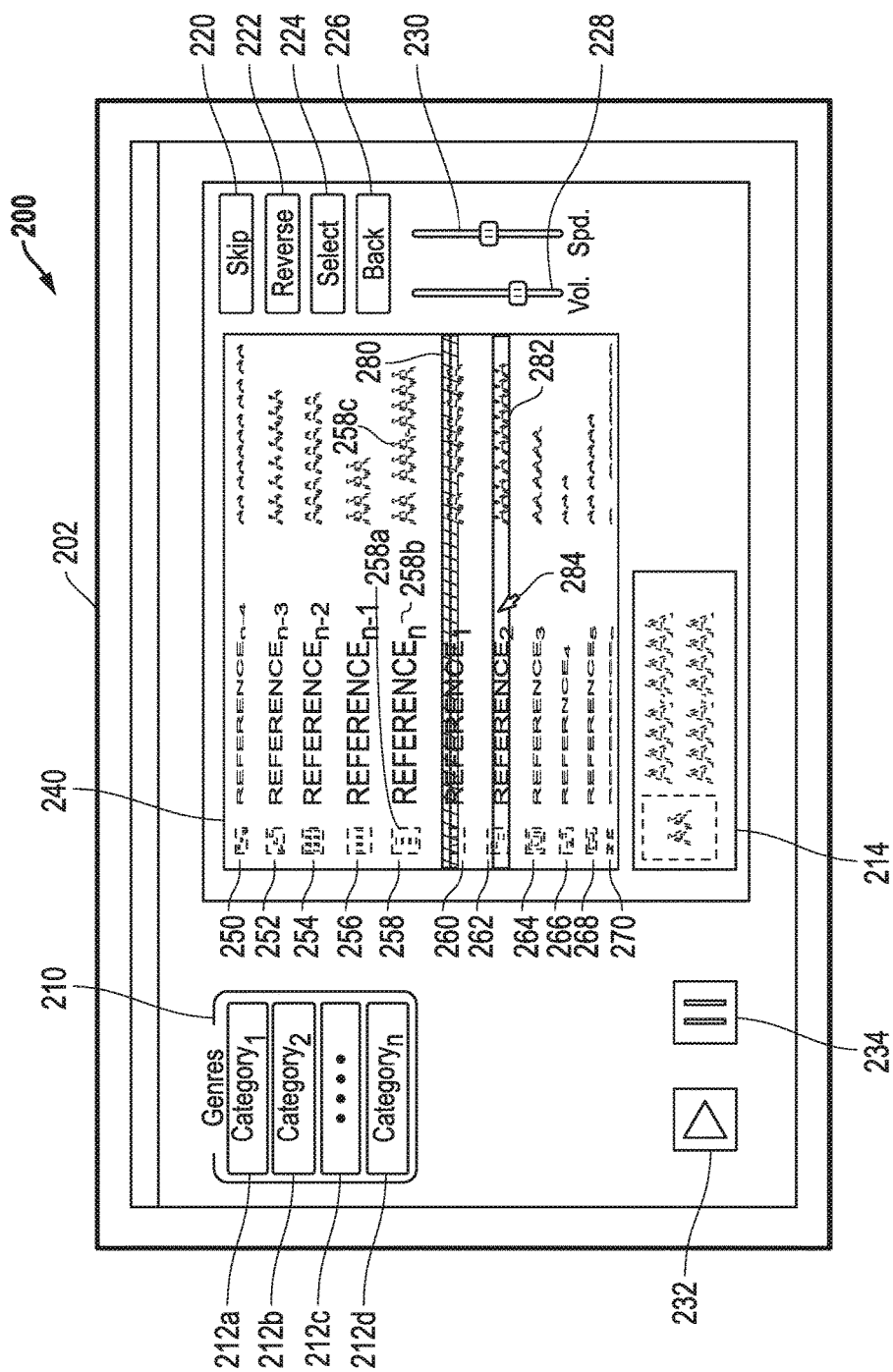
FIG. 2 is a diagram of a first-selection interface of a graphical user interface (GUI) in accordance with a first embodiment of the present invention.

Referring to FIG. 2, first-selection interface 200 of a graphical user interface (GUI) in accordance with a first embodiment of the present invention is provided. First-selection interface 200 is exemplified as being displayed on display screen 202 of user device 120. Category-selection area 210 may be provided for enabling a user to select a category (or genre) of media elements. Category-selection area 210 is exemplified having four category-selection buttons for 212a, 212b, 212c, and 212d. Each category-selection button 212 corresponds to a playlist, or a group of references, associated with a plurality of media elements (e.g., music albums). Media-element-display area 214 may be provided for displaying additional information related to a currently-playing media element (exemplified as by reference numeral 260). For example, media-element display area 214 may display cover art, title, price, etc. related to the currently-playing media element.

Playlist-display area 240 is provided and displays references (e.g., REFERENCE$_{n-1}$ 250 to REFERENCE$_6$ 270 are shown). Each reference is associated with a media element in the playlist. The references, as displayed, may comprise alphanumeric information (e.g., characters 258b and 258c) and visual information (e.g., image 258a) associated with the media element to which the reference is associated, and this information may be displayed in playlist-display area 240. Play-indicator 280, exemplified as a horizontal line with highlighting, is provided for providing a visual indication to identify which media element is the currently-playing media element (exemplified as reference 260). In certain embodiments, it also provides a visual indication of the remaining duration for which the currently-playing media element (e.g., 260) will be played as discussed in more detail below. In other embodiments, play-indicator 280 may be an icon, a symbol, highlighting, change of color, or other means for providing a visual indication to identify which media element is the currently-playing media element. Focus-indicator 282 (exemplified as highlighting of REFERENCE$_2$ 262) provides a visual indication of the reference over which user input device 284 (e.g., a mouse pointer) is hovering. User input device 284 may be then used to advance the playlist to the selected reference.

Skip button 220 may be provided for skipping (or advancing) to the next media element in the playlist (exemplified as reference 262). Play-order control (or "reverse") button 222 may be provided for reversing the order in which media elements are played, i.e., from top-to-bottom or bottom-to-top. Select button 224 may be provided for selecting the currently-playing media element and causing secondary-selection interface 300 (FIG. 3) to be displayed. Back button 226 may be provided for returning to the previous media element in the playlist (exemplified as reference 258). Volume-control bar 228 is provided for adjusting the volume level. Preview-speed-control bar 230 is provided for adjusting the duration that each media element is played. In alternate embodiments, preview-speed-control bar 230 may be provided by a pair of buttons instead of a control bar (see FIG. 4). Play button 232 and pause button 234 may be provided for starting and pausing playback, respectively. In other embodiments, a single button may be provided for starting and pausing playback, or such a button may be omitted and playback may commence automatically.

Figure 3:
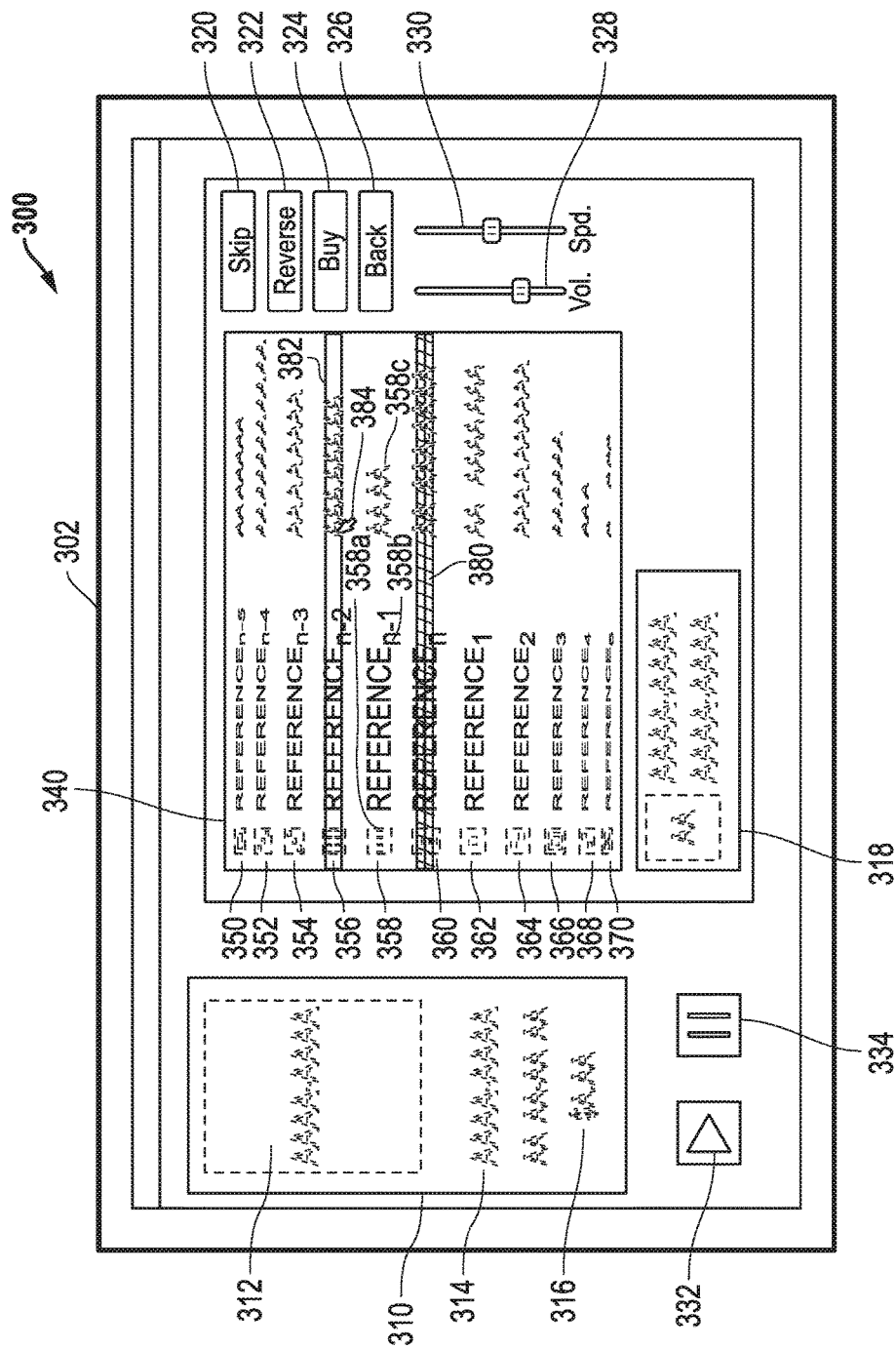
FIG. 3 is a diagram of a secondary-selection interface of the GUI in FIG. 2.

Referring to FIG. 3, secondary-selection interface 300 of the GUI in accordance with the first embodiment of the present invention is provided for displaying a secondary playlist of sub-media elements associated with the selected media element. Secondary-selection interface 300 is exemplified as being displayed on display screen 302 of user device 120. Display area 310 may be provided for displaying information related to the selected media element, such as album cover art 312, album title 314, pricing information 316, and the like. In alternate embodiments, additional or alternate information may be displayed. Sub-media-element display area 318 may be provided for displaying additional information related to the currently-playing sub-media element exemplified as reference 360. For example, sub-mediaelement display area 318 may display cover art, title, price, and the like related to the currently playing media element.

Playlist-display area 340 is provided and displays references (e.g., REFERENCE$_{n-4}$ 350 to REFERENCE$_6$ 370 are shown). Each reference is associated with a sub-media element of the secondary playlist. The references may, as displayed, comprise alphanumeric information (e.g., characters 358b and 358c) and visual information (e.g., image 358a) associated with the media element to which the reference is associated, and this information may be displayed in playlist-display area 340. Play-indicator 380, exemplified as a horizontal line with highlighting, is provided for providing a visual indication to identify which sub-media element is the currently-playing sub-media element (exemplified as reference 360). It also provides a visual indication of the remaining duration for which the currently-playing sub-media element (e.g., 360) will be played as discussed in more detail below. In alternate embodiments, play-indicator 380 may be an icon, a symbol, highlighting, change of color, or other means for providing a visual indication to identify which sub-media element is the currently-playing sub-media element. Focus indication 382 (exemplified as highlighting of display row 356) may be provided, which provides a visual indication of the reference over which user input device 384 (e.g., a mouse pointer) is hovering. User input device 384 may be then used to advance the playlist to the selected reference.

Skip button 320 is provided for skipping (or advancing) to the next sub-media element in the secondary playlist (exemplified as display row 362). Play-order control (or "reverse") button 322 is provided for reversing the order in which media elements are played, i.e., from top-to-bottom or bottom-to-top. Purchase or buy button 324 is provided, which allows a user to purchase the associated media content (e.g., the song or album). Back button 326 is provided for returning to the previous sub-media element in the secondary playlist (exemplified as reference 358). Volume-control bar 328 is provided for adjusting the volume level. Preview-speed-control bar 330 is provided for adjusting the duration each sub-media element is played. In alternate embodiments, preview-speed-control bar 330 may be provided by a pair of buttons instead of a control bar. Play button 332 and pause button 334 are provided for starting and pausing playback, respectively.

The operation of the GUI in accordance with the first embodiment of the present invention is now described with reference to FIGS. 1-3. Categories of media elements are stored in repositories 112 (FIG. 1) and are transmitted to user devices 120. This information is used to display various categories of media elements and provide category-selection buttons 212a, 212b, 212c, and 212d. In alternate embodiments, more or less categories may be provided or may be displayed as icons, lists, or other means. Using the appropriate button 212, a user may select a category of interest.

Upon selection of a category, the user's selection is transmitted to server 110, which requests a corresponding playlist and transmits the playlist to user device 102. The playlist preferably includes metadata (e.g., album title, cover art, and artist) associated with each media element in the playlist. This information is stored in a reference list and displayed as references (e.g., 250-270) in playlist-display area 240. The reference list is implemented as a linked list or medial elements list. This process operates substantially the same as the process described below (see FIG. 5). Each media element is associated with a reference. For example, the first media element of the playlist is associated with REFERENCE$_1$ 260, then the next media element is associated with REFERENCE$_2$ 262, and so on. The last media element in the playlist is associated with REFERENCE$_n$ 258, the second to last to REFERENCE$_{n-1}$ 256, and so on. Playlist-display area 240 displays the references in the playlist associated with: the currently-playing media element (exemplified as 260), the preceding five media elements in the playlist (exemplified as 250-258), and the next five media elements (exemplified as 262-270). Typically, playlist-display area will not be able to display all the references at the same time. As playback continues, the references are scrolled into the playlist-display area 240. In other embodiments, more or less than five preceding or next media elements may be displayed in display area 340. In this manner, playlists of any size may be presented.

The currently-playing media element, exemplified as reference 260, may be automatically played or manually played using play button 232. The associated media content (e.g., audio or video) may be downloaded or streamed from server 110. The associated media content may be stored in a media-content list as explained in more detail below (see FIG. 6). As the media content is played, display rows 250-270 are scrolled upwards (or downwards if play-order control button 222 was activated).

The currently-playing media element is played for a predetermined duration or play-duration, e.g., 20 seconds. The scroll-rate for the references is provided by the following equation:

$$\text{scroll} - \text{rate in pixels per second} = \frac{[\text{height in pixels of reference}]}{[\text{play} - \text{duration in seconds}]}$$

For example, when the currently-playing media element begins to play, play-indicator 280 will be at the upper edge of reference 260. As it is playing, the references (e.g., 250-270) displayed in display area 240 will be scrolled. The play-indicator 280 reaches the bottom edge of reference 260 after the play-duration, and then the next media element (corresponding to reference 262) will be played, also for the same play-duration. This is advantageous as it provides a visual indication of the play-back time remaining. Additional references (not shown) are also scrolled in from the bottom of playlist-display area 240 and references at the top of playlist-display area 240 are scrolled out of view during playback. Using preview-speed-control bar 230, a user may increase or decrease the play-duration, which causes the scroll-rate to also change.

Playback need not begin at the beginning of the media content associated with a media element, but may start at a predetermined location therein. For example, a media element, such as a popular song, may advantageously begin playing at the beginning of the chorus of the song. This is advantageous as it allows a user (or customer) to quickly and efficiently preview many media elements.

A user may jump ahead or back by clicking on a particular reference. For example, when a user clicks on reference 262, the entire list would be scrolled or shifted so that reference 262 would be indicated by play-indicator 280 to be the currently-playing media element. References 250 and 252 would be removed from display area 240. Two new references, REFERENCE$_7$ and REFERENCE$_8$ (not shown), would scroll up from the bottom of display area 240 to take the places previously held by references 268 and 270. Similarly, a user may use skip button 220 and back button 226 to traverse forward or backward through the playlist.

Using select button 224, a user may select the currently-playing media element. The selection is then transmitted to server 110. Server 110 requests a second playlist associated with the selection from media repository 112, which is transmitted to user device 102. For example, if the media element selected in display area 240 was an album, then the secondary playlist would comprise a list of songs in the album.

The secondary playlist is displayed on secondary-selection interface 300. Information, such as cover art 312, title 314, and price 316 may be displayed in the display area 310. Playlist display area 340 displays sub-media elements of the secondary playlist similarly as playlist display area 240 described above. A user may purchase the media content (e.g., a song or entire album) using buy button 324. In all other respects, secondary-selection interface 300 operates in substantially the same manner as first-selection interface 200 as described above.

Figure 4:
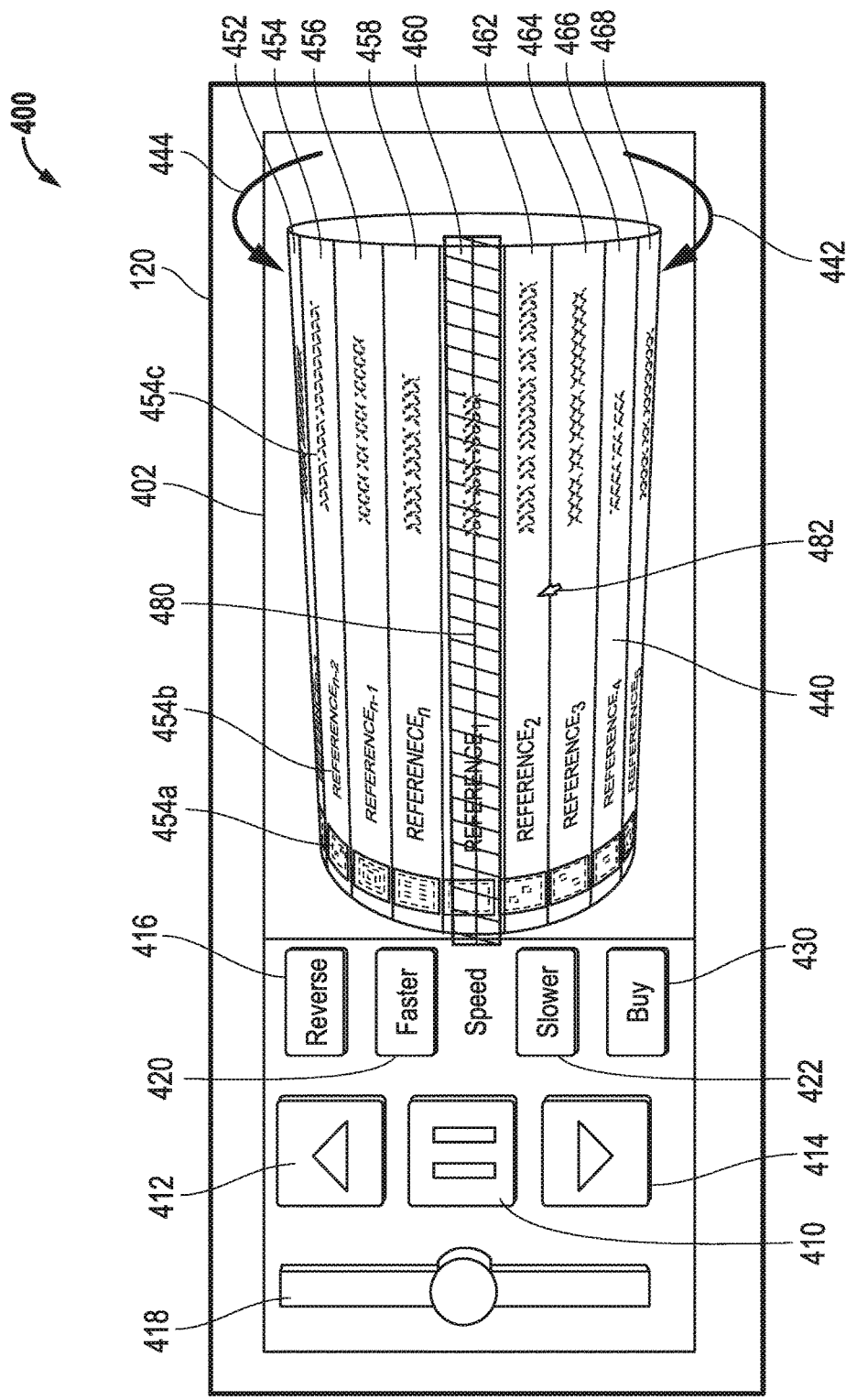
FIG. 4 is a diagram of a 3D GUI in accordance with a second embodiment of the present invention.

Referring to FIG. 4, 3D graphical user interface ("3D GUI") 400 in accordance with a second embodiment of the present invention is provided. 3D GUI 400 is exemplified as being displayed on display screen 402 of user device 120. 3D GUI 400 may be implemented using a 3D gaming engine, for example, blender™ or three.js™ (which is based on Javascript and WebGL).

Play/pause button 410 may be provided for starting and pausing playback, respectively. In other embodiments, separate buttons for starting and stopping playback, respectively, may be provided as shown in FIGS. 2-3 or playback may begin automatically. Back button 412 may be provided for causing the previous media element in the playlist to be played. Skip button 414 may be provided for skipping (or advancing) to the next media element in the playlist. Play-order control (or "reverse") button 416 is provided for reversing the order in which media elements are played, i.e., from top-to-bottom or bottom-to-top. Volume-control bar 418 is provided for adjusting the volume level. Preview-speed-control buttons 420 and 422 are provided for increasing or decreasing, respectively, the duration each media element is played (or play-duration). In alternate embodiments, preview-speed control may be provided by a control bar as shown in FIG. 2 (element 230). Optionally, buy or purchase button 430 is provided for allowing a user to purchase the selected content (e.g., the song or album).

3D playlist-display area 440 is exemplified as a 3D drum. 3D playlist-display area 440 displays references associated with medial elements of a playlist. 3D playlist-display area 440 is exemplified displaying $REFERENCE_{n-3}$ 452 to $REFERENCE_5$ 468. Each reference, as displayed, may comprise alphanumeric information (e.g., characters 454b and 454c) and visual information (e.g., image 454a) associated with a media element of the playlist, e.g., artist, song title, album name, and cover art. Play-indicator 480, exemplified as a horizontal line with highlighting, is provided for providing a visual indication to identify which media element is the currently-playing media element (exemplified as $REFERENCE_1$ 460). It also provides a visual indication of the remaining duration for which the currently-playing media element (e.g., 460) will be played as discussed in more detail below. In alternate embodiments, play-indicator 480 may be an icon, a symbol, highlighting, coloring, or other means for providing a visual indication to identify which media element is the currently-playing media element.

Although not shown on FIG. 4, a category selection area and additional display areas may be provided as shown in FIGS. 2-3 (see reference numerals 210, 214, 312, and 318).

In addition, a secondary-selection interface may be provided similarly to the secondary-selection interface of FIG. 3 described above.

The operation of 3D GUI 400 is now provided with reference to FIGS. 1 and 4-8. Server 110 requests media elements (collectively, a playlist) and transmits the playlist to user device 120. Each media element may include visual (e.g., image 454a) and alphanumeric (e.g., characters 454b and 454c) information, which are displayed as references (e.g., $REFERENCE_{n-3}$ 452 to $REFERENCE_5$ 468) on 3D playlist-display area 440. For example, a music playlist may contain song titles and album cover art.

Figure 5:
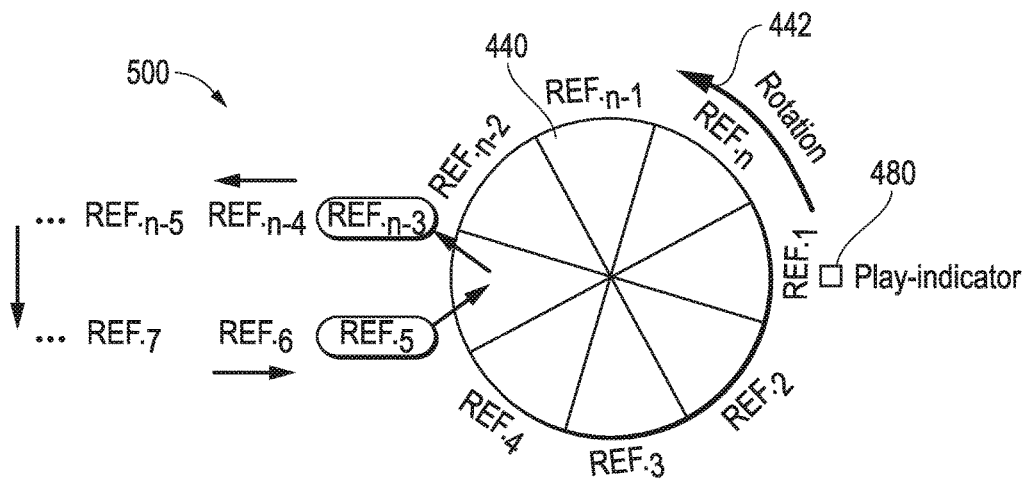
FIG. 5 is a diagram of a reference list in accordance with principles of the present invention.

Referring more specifically now to FIG. 5 (the 3D playlist-display area 440 shown in FIG. 4 is scaled down for clarity, i.e., with fewer references than shown in FIG. 4.), the playlist may be implemented as a linked list or reference list 500. The first media element of the playlist is associated with $REFERENCE_1$ 460, which is displayed with its top edge in line with play-indicator 480, then the next media element is associated with $REFERENCE_2$, and so on. The last media element in the playlist is associated with $REFERENCE_n$ 458 and displayed above $REFERENCE_1$, the second to last media element is associated with $REFERENCE_{n-1}$ 456, and so on. Thus, playlists of any size may be presented.

Figure 6:
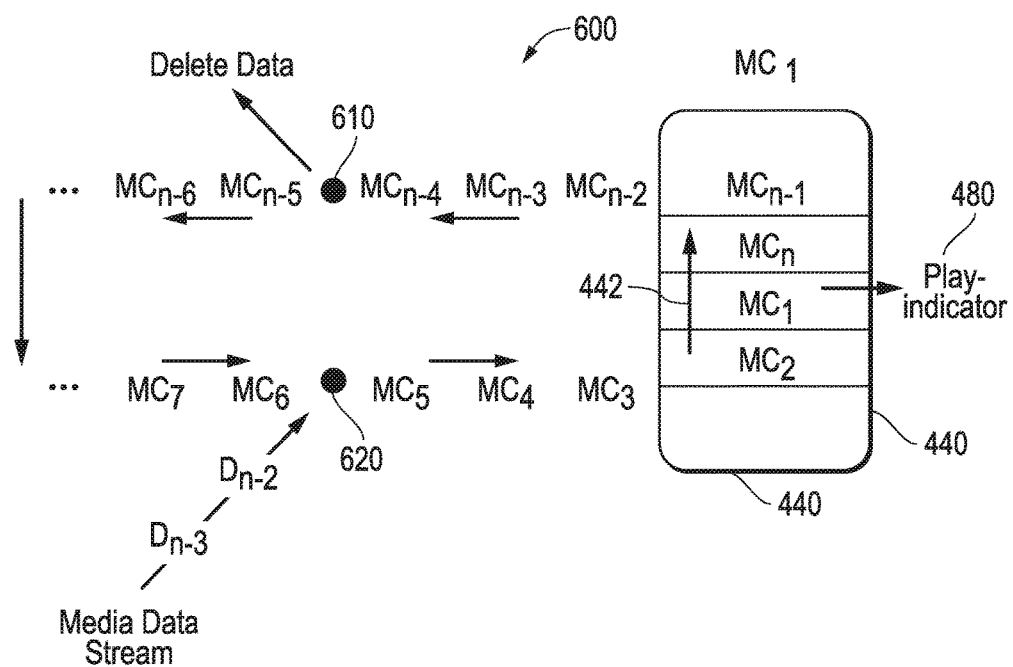
FIG. 6 is a diagram of a media-content list in accordance with principles of the present invention.

The currently-playing media element may be automatically played, or manually played using play/pause button 410. The corresponding media content (e.g., audio or video) may be downloaded or streamed from server 110. As the media content is played, 3D playlist-display area 440 is rotated in the direction shown by arrow 442. As shown in FIG. 6, only media content for the currently-playing media element (exemplified as MCA the preceding five media elements (exemplified as $MC_n$ to $MC_{n-4}$), and the next five media elements (exemplified as $MC_2$ to $MC_5$) are retrieved from server 110 and stored in media content list 600 (stored locally) at user device 120. As playback continues, media content is deleted from (610) and added to (620) media content list 600. In alternate embodiments, media content for fewer than five or less than five media elements may be retrieved from server 110 and stored at user device 120 in media content list 600.

Figure 7:
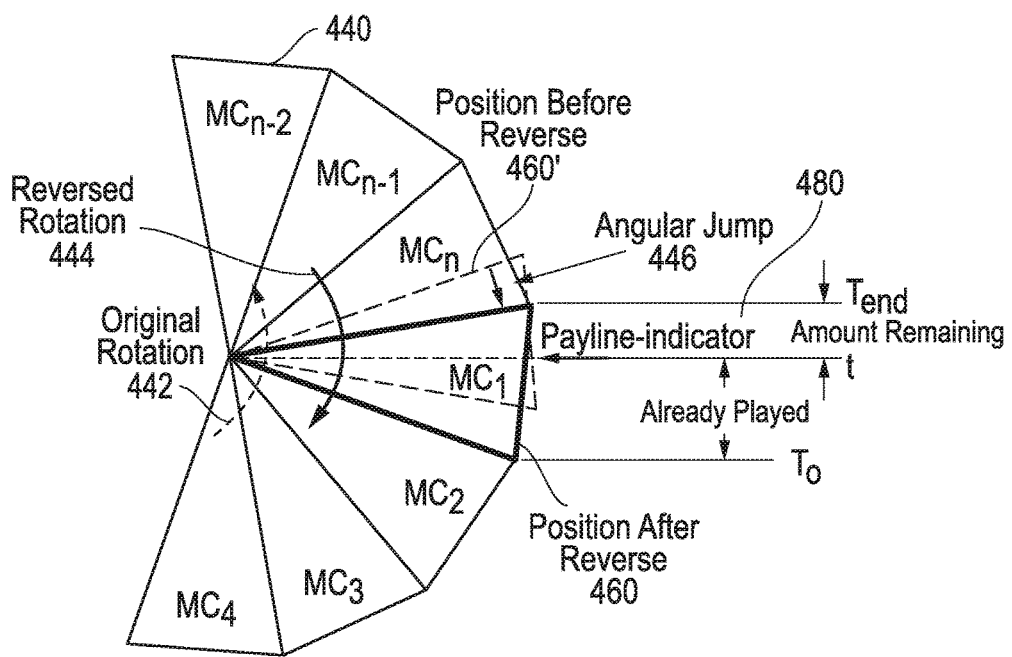
FIG. 7 is a diagram of a play-order control feature in accordance with principles of the present invention.

Referring more specifically now to FIG. 7, the user may use play-order control button 416 to reverse the order in which the playlist is played, in which case, 3D playlist-display area 440 would rotate in a reverse direction as shown by arrow 444. Optionally, when reversed, 3D playlist-display area 440 may rotate, or undergo angular jump 446, such that play-indicator 480 indicates the same amount of time remaining that the currently-playing media element will be played with respect to play-indicator 480 when playing in reverse.

Figure 8:
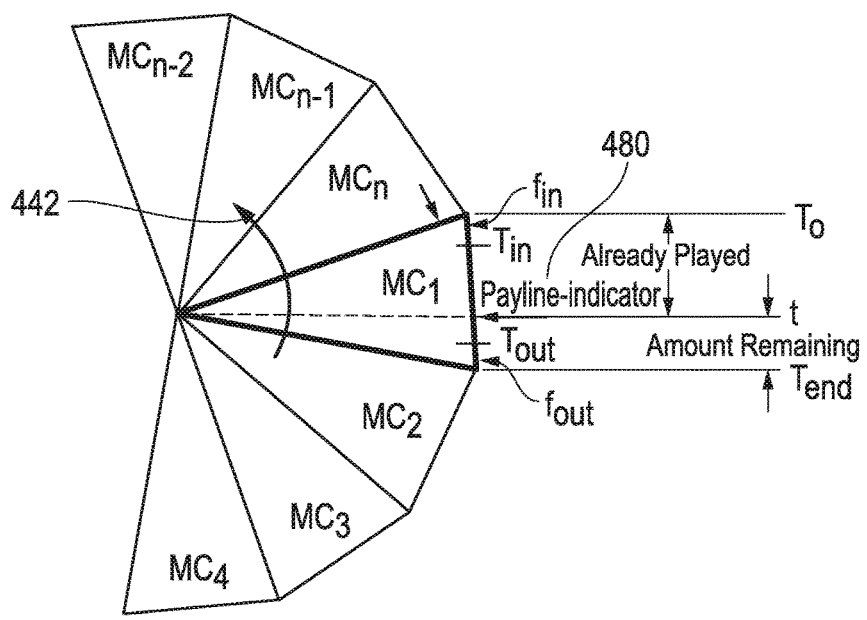
FIG. 8 is a diagram of fade-in and fade-out features in accordance with principles of the present invention.

Referring more specifically now to FIG. 8, each media element is played for a predetermined duration or play-duration ($T_0$+[play-duration]=$T_{end}$), e.g., 30 seconds. The play-duration determines the scroll-rate of playlist-display 440. When the currently-playing media element begins to play (at $T_0$), play-line 480 will preferably be at the upper edge of reference 460. As play continues, 3D playlist-display area 440 rotates such that play-indicator 480 will reach the bottom edge of display row 460 after the play-duration (at $T_{end}$). Then, the next media element ($REFERENCE_2$ 462) will be played (i.e., the media content associated with the referenced media element will be output), also for the same play-duration. Using preview-speed control buttons 420 and 422, a user may increase or decrease the play-duration, thereby also increasing or decreasing the scroll-rate of 3D playlist-display area 440. In certain embodiments, the play-duration will increase or decrease only for the currently-playing media element and then return to the default play-duration for the next media element.

Referring more specifically now to FIGS. 8 and 8A-8C, the end portion ($T_{out}$ to $T_{end}$) of the currently-playing media content ($MC_1$) (or segment) may be faded out and the beginning portion ($T_0$ to $T_{in}$) of the next media content ($MC_2$) may be faded in in certain embodiments. Fading in may be performed by the following function:

$$f_{in}(t) = \text{Volume} * [1.0 - e^{-At^2}], \text{ where } t = [T - T_0]/[T_{in} - T_0]$$
and $A$ is a constant.

Fading out may be performed by the following function:

$$f_{out}(t) = \text{Volume} * e^{-Bt^2}, \text{ where } t = [T - T_{out}]/[T_{end} - T_{out}]$$
and $B$ is a constant.

In the above functions, T=the current play time; $T_0$=segment start time; $T_{end}$=segment end time. Preferably, A=4.7 and B=4.7. Preferably, $$T_{in} = T_0 + 0.1 * [T_{end} - T_0]; \text{ and}$$

$$T_{out} = T_0 + 0.9 * [T_{end} - T_0].$$

Alternatively, $f_{in}$ and $f_{out}$ may be functions of the angle of rotation of 3D display 440 (or the drum) with respect to play-indicator 380. In other embodiments, a linear fade or other similar functions may be used. In still other embodiments, fading out and fading in may be performed using the same (but inverted) function or entirely different functions. The functions, $f_{in}$ and $f_{out}$, may be implemented using lookup tables, which is advantageous as it conserves computational resources.

Figure 8A:
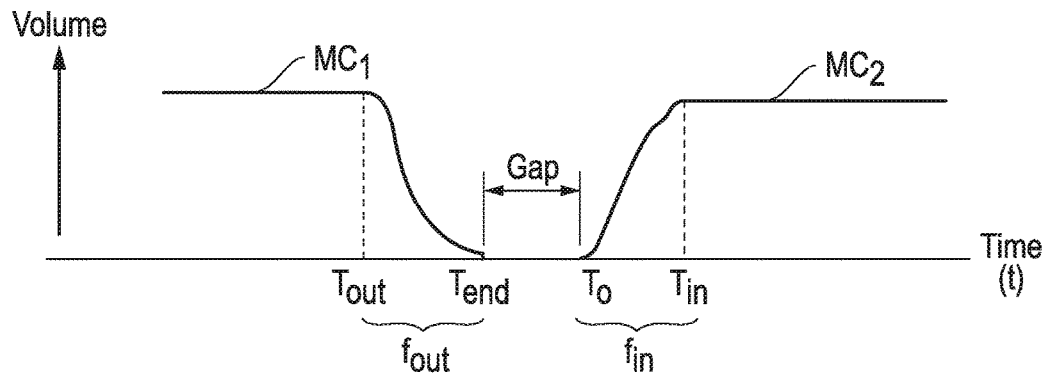
FIGS. 8A-8C are graphs of alternate embodiments of the fade-in and fade-out features in accordance with principles of the present invention.
Figure 8B:
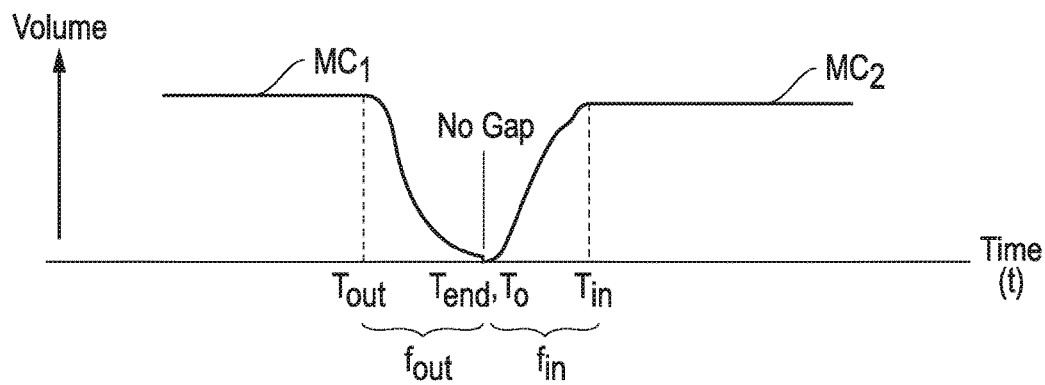
Figure 8C:
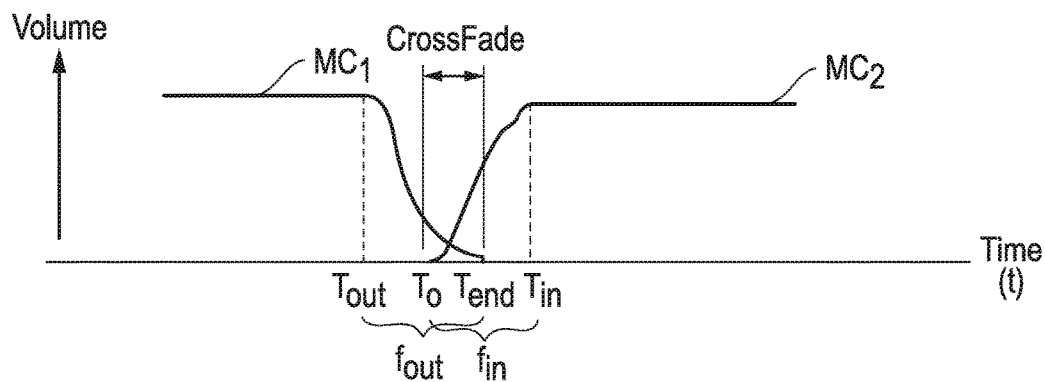

In certain embodiments, a silence gap may be present between the fade out of the ending portion of a first media content (e.g., $MC_1$) and the fade in of the beginning portion of the next media content (e.g., $MC_2$) (see FIG. 8A). In other embodiments, the beginning portion of the next media content (e.g., $MC_2$) may fade in immediately after the ending portion of the previous media content (e.g., $MC_1$) has faded out (see FIG. 8B). In still other embodiments, the fading in of the beginning portion of the next media content (e.g., $MC_2$) at least partially overlaps with the fading out of the ending portion of the previous media content ($MC_1$) (see FIG. 8C).

Playing need not begin at the beginning of the media content, but may start at a predetermined location therein, which may be the most relevant or recognizable portion of the media content. For example, a media element such as a popular song may advantageously begin playing at the beginning of a well-known verse or chorus. This is advantageous as it allows a user (or customer) to quickly recognize the song and may also increase marketability of the media content. However, unlike the beginnings and endings of media content (e.g., songs), which are typically smooth, the beginnings (around $T_0$) and endings (around $T_{end}$) of a selected portion ($T_0$ to $T_{end}$) of the media content may not be smooth and may contain undesirable artifacts (e.g., pops). This problem is further exacerbated because the duration ($T_{end}$) of each media element may vary. Fading in and fading out advantageously reduces such undesirable artifacts.

A user may jump ahead or back by clicking on a particular reference. For example, when a user clicks on display row 462 (as shown by pointer 482), playlist-display 440 would rotate so that REFERENCE$_2$ 462 was underneath play-line 480 and becomes the currently-playing media element (previously held by REFERENCE$_1$ 460). REFERENCE$_{n-2}$ 454 would rotate out of view, and REFERENCE$_6$ (not shown) would rotate up from the bottom of the drum in the position previously occupied by display area 468. Similarly, a user may use skip button 414 and back button 412 to traverse forward or backward through the playlist. Using buy button 430, a user may select the currently-playing media element (e.g., the song or album) for purchase.

It is understood that the present invention may take many forms and embodiments. Accordingly, several variations may be made in the foregoing without departing from the spirit or the scope of the invention. For example, additional interfaces may be added.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A system for presenting media content comprising:
    a processor;
    a memory device electrically connected to the processor, the memory device being configured for storing program code which, when executed by the processor, causes the processor to perform the steps of:
    displaying one or more references associated with one or more media elements in a playlist-display area on a 3D graphical representation of a rotating cylinder;
    displaying alphanumeric information and an image associated with the first media element in the playlist-display area;
    displaying a stationary play-indicator on the playlist-display;
    outputting media content associated with a first media element of the one or more media elements for a predetermined play duration during which the first media element intersects the play-indicator on the play-list-display;
    scrolling the references at a scroll-rate;
    the scroll-rate being related to an image size of the references and the predetermined play duration; and,
    outputting media content associated with a second media element of the one or more media elements for the predetermined play duration.

2. The system of claim 1, wherein the program code further causes the processor to perform the steps of:
    displaying a first preview-speed-control button, wherein the first preview-speed-control button is selectable by a user; and
    decreasing the play-duration when the first preview-speed-control button is selected.

3. The system of claim 1, wherein the program code further causes the processor to perform the steps of:
    displaying a second preview-speed-control button, wherein the second preview-speed-control button is selectable by a user; and
    increasing the play-duration when the second preview-speed control button is selected.

4. The system of claim 1, wherein the program code further causes the processor to perform the steps of:
    displaying a preview-speed-control bar, wherein the preview-speed-control bar is configurable by a user; and wherein the play-duration is configured based on configuration of the preview-speed-control bar.

5. The system of claim 1, wherein the scroll-rate is determined in accordance with the following equation:

$$\text{scroll rate in pixels per second} = \frac{[\text{height in pixels of reference}]}{[\text{play} - \text{duration in seconds}]}.$$

6. The system of claim 1, wherein the play-indicator is a horizontal line.

7. The system of claim 1, wherein the media content is audio data.

8. The system of claim 1, wherein the media content is audio-visual data.

9. The system of claim 1, wherein the play-duration is within the range of 10 seconds to 60 seconds.

10. The system of claim 1, wherein the program code further causes the processor to perform the steps of:
   receiving alphanumeric information from a remote media repository; and
   storing the alphanumeric information in a reference list.

11. The system of claim 1, wherein the program code further causes the processor to perform the steps of:
   receiving media content from a remote media repository; and
   storing the media content in a media content list.

12. The system of claim 1, wherein the program code further causes the processor to perform the steps of:
   fading out the output of an ending portion of the media content associated with the first media element; and
   fading in the output of a beginning portion of the media content associated with the second media element.

13. The system of claim 12, wherein the program code further causes the processor to perform the step of:
   starting the step of fading in the output of the beginning portion of the media content associated with the second media element following a predetermined period of silence after completion of the step of fading out the output of the ending portion of the media content associated with the first media element.

14. The system of claim 12, wherein the program code further causes the processor to perform the step of:
   starting the step of fading in the output of the beginning portion of the media content associated with the second media element immediately after the completion of the step of fading out the output of the ending portion of the media content associated with the first media element.

15. The system of claim 12, wherein the program code further causes the processor to perform the step of:
   starting the step of fading in the output of the beginning portion of the media content associated with the second media element prior to the completion of the step of fading out the output of the ending portion of the media content associated with the first media element.

16. The system of claim 12, wherein the program code further causes the processor to perform the step of:
   accessing a lookup table to perform the step of fading out or the step of fading in.

17. The system of claim 12, wherein the step of fading in is performed in accordance with the following equation:

$$f_{in}(t) = \text{Volume} * [1.0 - e^{-At^2}], \text{ where } t = [T - T_0]/[T_{in} - T_0]$$
$$\text{and } A = 4.7.$$

18. The system of claim 12, wherein the step of fading out is performed in accordance with the following equation:

$$f_{out}(t) = \text{Volume} * e^{-Bt^2}, \text{ where } t = [T - T_{out}]/[T_{end} - T_{out}]$$
$$\text{and } B = 4.7.$$

19. The system of claim 12, wherein either the step of fading in or the step of fading out is performed in accordance with a linear function.

20. The system of claim 1, wherein the program code further causes the processor to perform the steps of:
   displaying a play-order-control button, wherein the play-order control button is selectable by a user;
   reversing the order in which media content associated with the one or more media elements is output when the play-order control button is selected; and
   scrolling the references in the reverse direction while audio is being output when the play-order control button is selected.

21. The system of claim 20, wherein the program code further causes the processor to perform the step of:
   shifting the references with respect to the play-indicator when the play-order control button is selected, thereby the play-indicator indicates the same remaining play-duration as before the play-order control button was selected.

22. The system of claim 1, further comprising:
   the 3D graphical representation of the rotating cylinder being rotating on an axis not parallel to a display surface.

23. The system of claim 20, further comprising:
   displaying a focus indicator providing a visual indication of a desired reference over which a user input device is hovering, for selection and advancement to the desired reference.

* * * * *